United States Patent [19]

Lehnhoff

[11] Patent Number: 4,575,662
[45] Date of Patent: Mar. 11, 1986

[54] VEHICLE POWER WINDOW CONTROL CIRCUIT

[75] Inventor: Richard N. Lehnhoff, Kettering, Ohio

[73] Assignee: General Motors Corporation, Detroit, Mich.

[21] Appl. No.: 674,688

[22] Filed: Nov. 26, 1984

[51] Int. Cl.$^4$ ............................................. H02P 1/22
[52] U.S. Cl. ..................................... 318/282; 318/293; 318/345 C
[58] Field of Search ............... 318/280, 281, 282, 286, 318/293, 294, 345 B, 345 C

[56] References Cited

U.S. PATENT DOCUMENTS

| | | | |
|---|---|---|---|
| 4,001,661 | 1/1977 | Terabayashi | 318/264 |
| 4,146,827 | 3/1979 | Krohn | 318/345 C X |
| 4,328,451 | 5/1982 | Barge | 318/596 |
| 4,338,552 | 7/1982 | Pilz et al. | 318/286 X |
| 4,347,465 | 8/1982 | Goertler | 318/286 X |
| 4,373,149 | 2/1983 | Coste | 318/256 X |
| 4,394,605 | 7/1983 | Terazawa | 318/256 X |
| 4,438,378 | 3/1984 | Tanaka | 318/280 |
| 4,447,768 | 5/1984 | Terui | 318/293 |
| 4,459,521 | 7/1984 | Barge | 318/257 |
| 4,476,416 | 10/1984 | Licata et al. | 318/283 |
| 4,477,751 | 10/1984 | Kanayama | 318/280 |
| 4,514,666 | 4/1985 | Suzuki | 318/293 |
| 4,527,103 | 7/1985 | Kade | 318/293 |

FOREIGN PATENT DOCUMENTS

| | | |
|---|---|---|
| 0107537 | 5/1984 | European Pat. Off. . |
| 2820330 | 11/1979 | Fed. Rep. of Germany ...... 318/282 |
| 2484168 | 12/1981 | France . |
| 2013482 | 8/1979 | United Kingdom . |

Primary Examiner—William M. Shoop, Jr.
Assistant Examiner—Bentsu Ro
Attorney, Agent, or Firm—Robert M. Sigler

[57] ABSTRACT

A control circuit for a one-touch vehicle window control uses a pair of switches, each switch actuating a still window for movement in one of two opposite directions but being effective to stop a window moving in the opposite direction from that which it initiates. The motor is in an H-switch bridge with SCRs and FETs, with each switch providing actuating signals to an SCR and FET for one armature current direction and further providing an actuating signal through an impedance to a discharge transistor connected across a capacitor connected to the gate of the FET for the opposite armature current direction. The base of each discharge transistor is connected to another capacitor and through another impedance to the junction of a FET and a motor armature terminal. Each connected pair of impedances forms a voltage divider to turn off a FET upon the detection of motor stall current therethrough; and the impedances further act to ensure the non-conduction of the non-activated FET to prevent a short circuit of the power supply.

2 Claims, 1 Drawing Figure

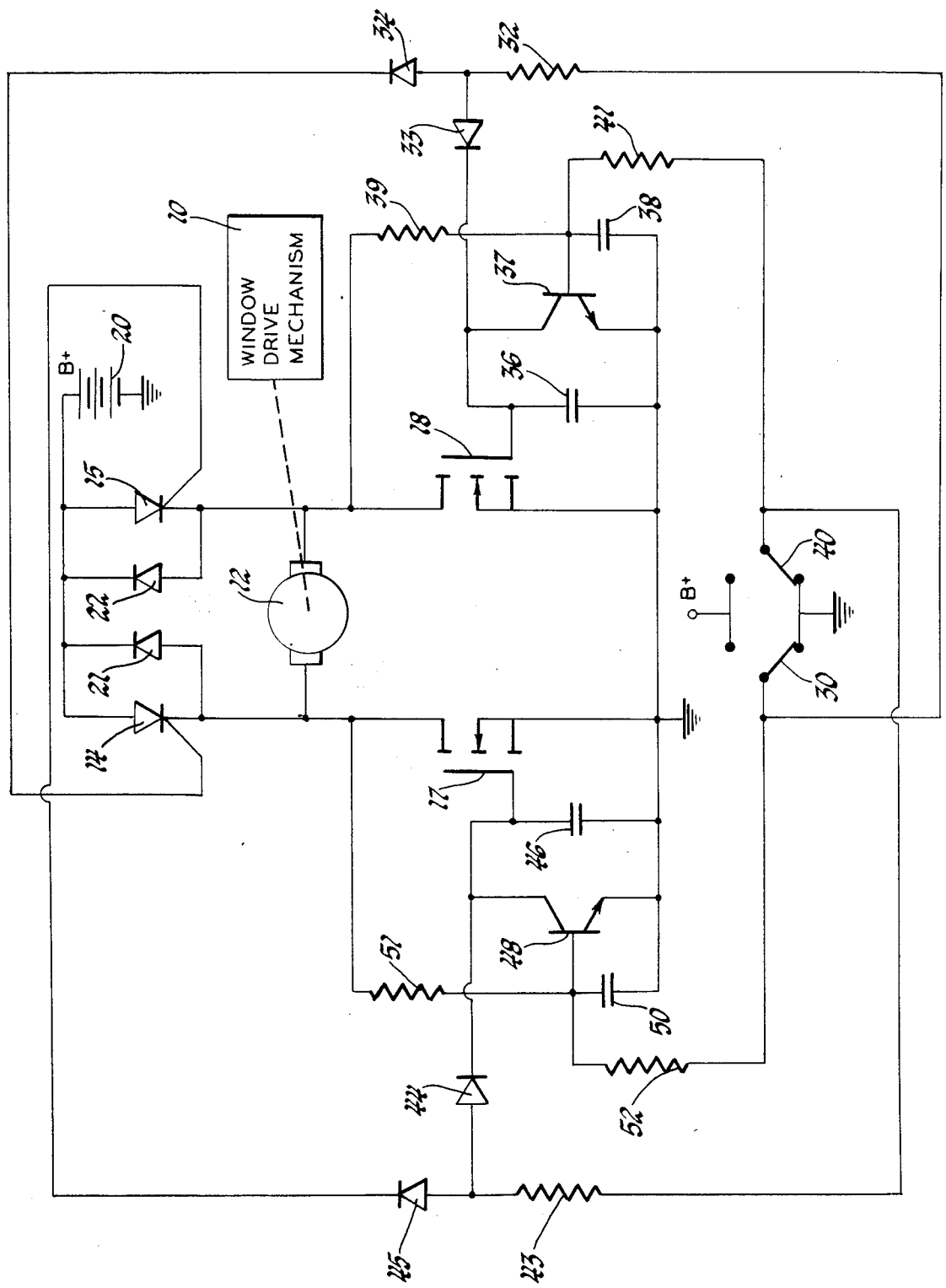

VEHICLE POWER WINDOW CONTROL CIRCUIT

SUMMARY OF THE INVENTION

This invention is a motor drive control apparatus for a vehicle window capable of being driven in two directions. The apparatus is a one-touch control, in which a single touch of a first actuator initiates window movement and such movement continues until the motor stalls due to end of travel or an obstruction or until a second actuator is touched. Few such controls exist in the prior art; and those that do are generally complex in circuitry. The control of this invention, however, uses circuitry with significantly fewer elements for simpler construction and reduced cost. Although, in one sense, separate switches and circuits are provided to control window movement in each direction, several elements in each circuit perform dual functions for a reduced part count. One of the functions performed by these elements is the prevention of a short circuit across the power supply through the semiconductor switching elements of a motor controlling H-switch bridge. Further details and advantages of this invention will be apparent from the accompanying drawing and following description of the preferred embodiment.

DESCRIPTION OF THE PREFERRED EMBODIMENT

Referring to the sole Figure, a window drive mechanism 10 of conventional construction is provided to raise and lower a vehicle window between full closed and full open positions when driven by a reversible DC motor 12, which may have a permanent magnet or wound field. The permanent magnet field is preferred; and the connections shown in the figure are those of the armature terminals. In the case of a wound field motor, field power connections are standard in the art and are therefore not shown.

Motor 12 is connected with its armature terminals in an H-switch bridge arrangement with a pair of SCRs 14, 15 (2N6400) and a pair of FETs 17, 18 (BUZ10 or TP5000). SCRs 14, 15 both have anodes connected to the B+ side of an electric power source 20, which is shown as a battery but generally includes the vehicle alternator and voltage regulator as well. The cathodes of SCRs 14, 15 are connected, respectively, to the two armature terminals of motor 12; and these armature terminals are also connected, respectively, to the drains of FETs 17, 18. The sources of FETs 17, 18 are both connected to ground. The actuation of motor 12 is typical for such arrangements in that the actuation of SCR 14 and FET 18 causes current flow in one direction through the armature of motor 12 to produce motor rotation in a first direction to drive the window upward toward its closed position, whereas the actuation of SCR 15 and FET 17 causes current flow and motor rotation in the opposite direction to drive the window downward toward it full open position. SCRs 14, 15 are provided with reverse bypass diodes 21 and 22 to allow inductive load switching of the armature of motor 12 in the usual manner.

A first switch 30 includes an armature switchable between a first position in which it is grounded and a second position in which it is connected to power supply B+. The switch is mechanically biased into the first position The armature of switch 30 is connected at all times through a resistor 32 (390 ohms) and diode 33 to the gate of FET 18. It is further connected through resistor 32 and a diode 34 to the gate of SCR 14. The gate of FET 18 is connected to ground through a capacitor 36 (0.1 uF) and also through the collector-to-emitter path of an NPN, bipolar transistor 37 (2N3904) having a base connected to ground through a capacitor 38 (22uF) and further connected through a resistor 39 (10K) to the drain of FET 18.

A second switch 40 has an armature biased into a first position in which it is grounded but actuable to a second position in which it contacts the power supply B+. The armature of switch 40 is connected through a resistor 41 (10K) to the base of transistor 37, through a resistor 43 and diode 44 to the gate of FET 17 and through resistor 43 and a diode 45 to the gate of SCR 15. The gate of FET 17 is further connected through a capacitor 46 to ground and the collector-to-emitter current path of an NPN transistor 48 to ground. The base of transistor 48 is connected through a capacitor 50 to ground, through a resistor 51 to the drain of FET 17 and through a resistor 52 (10K) to the armature of switch 30. Component values for elements 41-51 are identical to those already given for the analogous elements on the other side of the Figure.

In order to initiate upward movement of the window drive mechanism 10, switch 30, which is normally in its grounded position as shown in the Figure, is momentarily closed to contact power supply B+. This produces high voltages through resistor 32 and diodes 33, 34 on the gates of SCR 14 and FET 18 to initiate current flow through the armature of motor 12 and drive window mechanism 10 in the upward direction. It further results in a quick charging of capacitor 36 through resistor 32 to maintain the high voltage on the gate of FET 18 as switch 30 is normally immediately returned to its grounded position. Diodes 33 and 34 block any reverse current flow back through resistor 32 and switch 30 when switch 30 is grounded to prevent the turnoff of either SCR 14 or FET 18 by such grounding.

The closure of switch 30 to the B+ power supply further provides current flow through resistor 52 to charge capacitor 50 and turn on transistor 48. This ensures that capacitor 46 is discharged and FET 17 is thus held off to prevent a short circuit across the power supply through SCR 14, which is now activated, and FET 17. Once SCR 14 begins conduction, some of its current is available through resistor 51 to maintain the charge on capacitor 50 and drive transistor 48 to hold FET 17 off after switch 30 is returned to its ground position.

Since SCRs, once actuated, remain conducting until the current therethrough is stopped, SCR 14 remains in a conducting condition until the current through the armature of motor 12 is stopped by the turnoff of FET 18; and FET 18 can be turned off only by the actuation of transistor 37 to discharge capacitor 36. In addition, as long as the current flow through the armature of motor 12 is at a reasonably low level indicating the absence of stall, the source-to-drain voltage across FET 18 is also low, since the voltage across an FET varies with the current therethrough. Resistors 39 and 41 form a voltage divider across FET 18 with values chosen to keep transistor 37 turned off under these conditions.

Transistor 37 can be turned on to turn off FET 18 and stop motor 12 in either of two ways. The first way is automatic, in that when the window reaches its travel limit or otherwise encounters an obstacle in its upward movement, the current through the armature of motor 12 rises significantly in a stall condition and thus increases the source-to-drain voltage of FET 18. The voltage on the base of transistor 37 rises proportionally with this increase and initiates the conduction of transistor 37 to discharge capacitor 36 and turn off FET 18. The armature current of motor 12 thus decreases quickly, with diode 22 absorbing the excess current until it decreases sufficiently to turn off SCR 14.

The operator may also cause the actuation of transistor 37 to stop window movement by closing switch 40 so that its armature contacts power supply B+. This provides current directly from the B+power supply through resistor 41 to charge capacitor 38 and actuate transistor 37 so that capacitor 36 is discharged to turn off FET 18 and SCR 14 as described above. Capacitor 38 maintains its charge, with the consequent holding off of FET 18, as long as necessary to ensure the turn off of SCR 14, since current from SCR 14 through the armature of motor 12 helps maintain the charge on capacitor 36 as long as it flows. In addition, since both FETs are held off during this phase of operation, SCR 15 is not permitted to turn on, even though the closing of switch 40 provides a conduction enabling voltage on its gate. When all current stops in SCR 14, assuming switch 40 has been released, both SCRs and both FETs will be in non-conducting states; and the circuit will be inactive, with the window remaining in the position selected by the operator. It should be noted that, if switch 40 is still closed to the B+power supply when SCR 14 stops conducting, FET 17 and SCR 15 will be enabled to begin actuation of motor 12 in the opposite direction for downward movement. Thus a short closure of switch 40 while the window is moving upward will stop the window; but continued closure of the switch will eventually cause reversal of window movement. It should also be noted that, once upward movement of the window is stopped by means of the closure of switch 40, it may be reinitiated in the upward direction by the momentary closure of switch 30 once again.

The operation of the circuit for downward movement will not be described in detail, since it is similar to that for upward movement using the analogous circuit elements on the other side of the Figure with the role of switches 30 and 40 reversed to control the actuation of SCR 15 and FET 17.

The circuit as described is a compact and efficient circuit for providing one-touch power window control, since many elements in it provide dual functions in different situations. For example, switches 30 and 40 each serve to initiate window movement in one direction when the window is still and to stop window movement when that movement is in the other direction. In addition, resistor 51 serves, when the window is moving upward with SCR 14 conducting and FET 17 not conducting, to conduct current from SCR 14 to capacitor 50 and the base of transistor 48 to prevent FET 17 from conducting if switch 40 is actuated to stop the window. However, when the window is moving downward with FET 17 conducting and SCR 14 not conducting, resistor 51 is part of a voltage divider with resistor 52 to automatically actuate transistor 48 and thus stop the window when motor stall current through FET 17 causes the voltage threreacross to increase. Of course, analogous statements can be made concerning resistor 39 on the other side. Further, resistor 52 comprises part of the voltage divider mentioned above while FET 17 is conducting but provides the signal conduct from switch 30 to transistor 48 to hold FET 17 off when up window movement is initiated. Finally, the circuit always provides protection against short circuit of the power supply through an SCR and an FET.

The embodiments of the invention in which an exclusive property or privilege is claimed are defined as follows:

1. Vehicle window drive apparatus comprising, in combination:

A source of electric power having first and second terminals;

an electric motor having first and second terminals;

first and second semiconductor switches connecting the first terminal of the source of electric power to the first and second terminals of the electric motor, respectively, the first and second semiconductor switches each having an actuating gate effective to latch the switch in a conducting condition until current therethrough is stopped;

third and fourth semiconductor switches connected in series between the first and second terminals, respectively, of the electric motor and the second terminal of the source of electric power, the third and fourth semiconductor switches having actuating gates and being characterized by a voltage thereacross which increases with current therethrough;

first and second actuating switches momentarily activatable to communicate, respectively, the actuating gates of the first and fourth semiconductor switches and the actuating gates of the second and third semiconductor switches with the first terminal of the source of electric power;

first and second capacitors connected from the actuating gates of the third and fourth semiconductor switches, respectively, to the second terminal of the source of electric power;

first and second discharge transistors connected across the first and second capacitors, respectively, the first and second discharge transistors having bases;

a first impedance connected in series between the first actuating switch and the base of the first discharge transistor, the first actuating switch normally communicating the base of the first discharge transistor through the first impedance to the second terminal of the source of electric power but being momentarily activatable to communicate the base of the first discharge transistor through the first impedance to the first terminal of the source of electric power;

a second impedance connected in series between the second actuating switch and the base of the second discharge transistor, the second actuating switch normally communicating the base of the second discharge transistor through the second impedance to the second terminal of the source of electric power but being momentarily activatable to communicate the base of the second discharge transistor through the second impedance to the first terminal of the source of electric power;

third and fourth capacitors connecting the bases of the first and second discharge transistors, repectively, to the second terminal of the source of electric power;

a third impedance connecting the base of the first discharge transistor to the first terminal of the electric motor, the first and third impedances forming a voltage divider effective to hold the first discharge transistor in a non-conducting state until the current through the first FET increases due to stalling of the electric motor or the second actuating switch is activated; and a fourth impedance connecting the base of the second discharge transistor to the second terminal of the electric motor, the second and fourth impedances forming a voltage divider effective to hold the second discharge transistor in a non-conducting state until the current through the second FET increases due to stalling of the electric motor or the first actuating switch is activated.

2. Apparatus for driving a vehicle window selectively in first or second directions comprising, in combination:

a source of electric power having first and second terminals;

an electric motor having first and second armature terminals;

a bridge circuit comprising first and second SCRs connected between the first terminal of the source of electric power and the first and second armature terminals, respectively, of the electric motor, the SCRs further having gates, the bridge circuit further comprising first and second FETs connected between the second terminal of the source of electric power and the first and second armature terminals, respectively, of the electric motor, the FETs further having gates;

a first switch having an armature terminal connected through a first impedance and first unidirectional current means to the gates of the first SCR and second FET;

a second switch having an armature terminal connected through a second impedance and second unidirectional current means to the gates of the second SCR and first FET, the first and second switches being biased into first states in which the armature terminals communicate with the second terminal of the source of electric power but being selectively activatable into second states in which the armature terminals communicate with the first terminal of the source of electric power;

first and second capacitors connected between the gates of the first and second FETs, respectively, and the second terminal of the source of electric power;

first and second transistors having collector-emitter paths connected across the first and second capacitors, respectively, and bases connected through third and fourth impedances, respectively, to the armature terminals of the first and second switches, respectively;

third and fourth capacitors connecting the bases of the first and second transistors, respectively, to the second terminal of the source of electric power; and fifth and sixth impedances connecting the first and second SCRs to the bases of the first and second transistors, respectively.

* * * * *